United States Patent [19]

Oishi et al.

[11] Patent Number: 4,589,609
[45] Date of Patent: May 20, 1986

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 689,276

[22] Filed: Jan. 7, 1985

[30] Foreign Application Priority Data

Jan. 11, 1984 [JP] Japan ................ 59-1250[U]

[51] Int. Cl.[4] ........................................ G11B 23/087
[52] U.S. Cl. ................................ 242/198; 360/132
[58] Field of Search ........... 242/192, 197–200; 360/132, 137; 352/72–78; 206/387, 389; 220/208, 209, 243, 246

[56] References Cited

U.S. PATENT DOCUMENTS

| 4,323,207 | 4/1982 | Gebeke | 242/198 |
| 4,372,504 | 2/1983 | Shibata et al. | 242/198 |
| 4,422,599 | 12/1983 | Okamura et al. | 242/198 |
| 4,485,988 | 12/1984 | Kikuya et al. | 242/198 |
| 4,519,521 | 5/1985 | Yoshii | 220/335 |

*Primary Examiner*—Billy S. Taylor
*Attorney, Agent, or Firm*—Sughrue, Mion, Zinn, Macpeak, and Seas

[57] ABSTRACT

A magnetic tape cassette including a cassette body having an opening formed in the front end wall thereof and a guard panel having right and left end pieces. The guard panel, which is swingable to open and close the opening, has an engaging groove formed in one of the end pieces, while the cassette body has a slide groove formed in one of the right and left side walls thereof. A lock member is slidably fitted in the slide groove and urged towards the guard panel by a leaf spring, thereby to lock the guard panel. The cassette is so formed that both slides are similar in configuration.

3 Claims, 4 Drawing Figures

MAGNETIC TAPE CASSETTE

BACKGROUND OF THE INVENTION

The present invention relates to magnetic tape cassettes, and more particularly to an improved magnetic tape cassette which is substantially equal in size to a Philips-type magnetic tape cassette.

Recently, cassette tape recorders have been reduced both in size and in weight. Accordingly, there has been a strong demand for magnetic tape cassettes suitable for high-quality and high-density signal recording and reproduction and which have long playing times.

Heretofore, signal recording and reproducing operations with compact magnetic tape cassettes generally employed for audio devices have been carried out in an analog mode using analog signals. However, with analog recording techniques, high-density signal recording and reproducing with compact magnetic tape cassettes are limited. On the other hand, it is well known in the art that a digital system such as pulse code modulation (PCM) in which signal recording and reproducing operations are carried out with input signals converted into pulse signals permits high-density signal recording and reproduction without adverse effects due to noise in the signal transmission paths and the quality of the recording medium employed.

Recently a magnetic head has been developed which permits high-density signal recording and reproducing as in multi-track signal recording and reproducing on a magnetic tape which is sufficiently small in width that it can be used in a Philips-type magnetic tape cassette. As a result, it is possible to perform a multi-track signal recording and reproducing operation with a compact magnetic tape cassette which is substantially equal in size to the Philips-type magnetic tape cassette.

For thirty-six track recording with the above-described compact magnetic tape cassette using such a stationary head, the width of each track is of the order of 100 microns, which is much smaller than that of each track in a conventional four-track recording operation with an ordinary Philips-type cassette. Due to the small head and track width, if dust from the magnetic tape becomes lodged in the magnetic head, the recorded information is much more adversely affected in recording and reproducing characteristics than in the conventional operation.

An example of a magnetic tape cassette suitable for recording and reproducing signals with a high density is a video tape cassette, which is ordinarily recorded on and reproduced using a rotary head system. In order to successfully use a video tape cassette to perform high-density signal recording, it is essential that the magnetic tape be protected from damage and from the effects of dust. For this purpose, the cassette includes a swingable guard panel to open and close the opening which is formed in the front end wall of the cassette body. In the rotary head system, the magnetic tape in the cassette (except for special cassettes) is run in only one direction for recording or reproducing signals, and therefore it is unnecessary, as in a magnetic tape cassette permitting the use of both sides (A and B sides), for both sides of the cassette to be symmetrical in construction. Furthermore, in the rotary head system, in general, two magnetic heads inclined with respect to the tape running direction and alternately brought into contact with the magnetic tape while being rotated, which has the effect of sweeping off dust. Therefore, there is a smaller likelihood that will effect the signal recording and reproducing characteristics compared with that in the case of the stationary system.

The technical concept of the invention is applied to a magnetic tape cassette which, like a Philips-type magnetic tape cassette, is recorded on and reproduced using a stationary head system, and which has a number of recording tracks and permits the use of the upper and lower halves of the magnetic tape for recording or reproducing signals, i.e., the use of both sides (A and B sides) thereof. Such a cassette, due to the use of a stationary head system, is more likely to be affected in signal recording and reproducing characteristics by dust than when a rotary head system is employed. Accordingly, the cassette needs a guard panel which provides an improved dust-proofing effect than the type of guard panel employed with an ordinary video tape cassette.

In general, as a magnetic tape cassette is miniaturized, the cassette body and the guard panel thereof cannot necessarily be reduced in wall thickness, as a result of which they are more likely to be deformed by an external force. Especially, the guard panel which opens and closes the opening formed in the front end wall of the cassette body should have a structure that permits positive closure of the opening and prevents unwanted movement of the guard panel.

SUMMARY OF THE INVENTION

In view of the foregoing, an object of the invention is to provide a magnetic tape cassette in which the guard panel positively closes the opening which is formed in the front end wall of the cassette body and a multi-track signal recording and reproducing operation can be carried out with both sides (A and B sides) thereof.

The foregoing object and other objects of the invention have been achieved by the provision of a magnetic tape cassette comprising a cassette case incorporating a pair of hubs on which a magnetic tape is wound and having a magnetic head inserting opening formed in the front end wall thereof; and a guard panel substantially U-shaped in section and having right and left end pieces, the guard panel being swingable vertically of the cassette case to close and open the opening of the cassette case, in which, according to the invention, the guard panel has a recess formed in at least one of the right and left end pieces in such a manner that the recess opens towards the cassette case, the cassette case has a pair of steps which are formed on the right and left side walls thereof by setting back the front end portions of the right and left side walls inwardly of the cassette case, and a slide groove formed in at least one of the right and left side walls in such a manner that the slide groove merges with the step formed on the one side wall and includes the upper and lower recesses which are formed respectively inside the upper and lower halves of the one side wall in such a manner that the recesses extend towards the back of the cassette case. Further, the cassette case is provided with a lock member having a locking protrusion which protrudes towards the guard panel so as to be fitted in the recess formed in the end piece of the guard panel, the lock member being slidably inserted in the slide groove and urged towards the guard panel by urging means. The two sides of the cassettes are symmetrical in configuration.

DESCRIPTION OF THE PREFERRED EMBODIMENTS

An example of a magnetic tape cassette according to the invention will be described with reference to the accompanying drawings.

Figure 1:
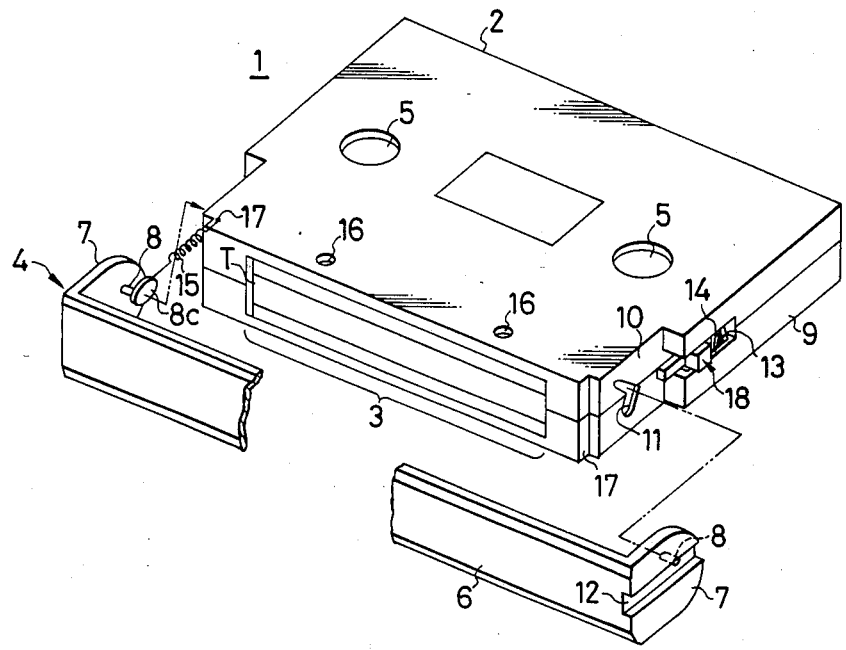
FIG. 1 is an exploded perspective view of a magnetic tape cassette in accordance with a preferred embodiment of the invention.

The magnetic tape cassette of the invention is substantially equal in size to the conventional Philips-type magnetic tape cassette. As shown in FIG. 1, the magnetic tape cassette 1 of the invention has an opening 3 in the front wall of a cassette case 2 made up of upper and lower halves, and a pair of holes 16 extending vertically through the cassette case 2. A guard panel 4 for closing the opening 3 is coupled to the cassette case 2 in such a manner that it is vertically swingable. The opening 3 receives the recording and reproducing head, the erasing head and the pinch roller of a magnetic tape recording and reproducing device. The holes 16 receive the capstans.

A magnetic tape T wound on a pair of hubs (not shown) is laid in the cassette case 2 in such a manner that it can run along the opening 3 of the cassette case 2. The hubs are arranged at a pair of shaft insertion holes 5 in a conventional manner into which the drive shafts of the recording and reproducing device are inserted. A shield board (not shown) for protecting the magnetic tape from external noise during recording and reproducing, and a leaf spring (not shown) with a pressure pad for positively bringing the magnetic tape T into contact with the magnetic heads may be provided along the opening 3 of the cassette body 2.

The front end portion of each of the right and left side walls 9 of the cassette case 2 is set back inwardly of the cassette case to form a step 10. A pair of shaft receiving through-holes 11 for receiving the rotating shafts 8 of the guard panel 4 and lower halves of each of the through-holes 11 are symmetrical in configuration with respect to the center line which divides the side wall 9 into upper and lower halves; in other words, each through-hole 11 is in the form of the character "L" which is inclined 45° as shown in FIG. 1. In one of the side walls 9, the step 10 merges with a slide groove 13 which extends backwardly along the aforementioned center line. More specifically, the slide groove 13 includes the upper and lower recesses which are formed inside the upper and lower halves, respectively, of the side wall 9. Cuts 17 are formed at both ends of the cassette case 2 extending vertically (in the widthwise direction of the cassette).

Figure 2:
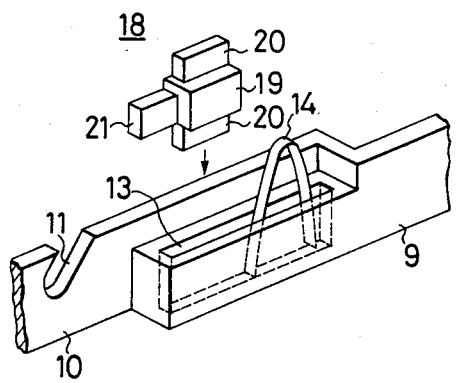
FIG. 2 is an exploded perspective view showing essential components of the magnetic tape cassette of FIG. 1.

A lock member 18, inserted in the slide groove 13, is slidable along the slide groove 13. The lock member 18, as shown in FIG. 2, is composed of a body part 19 which extends outside the cassette from the slide groove 13, two slide parts 20 which extend upwardly and downwardly from the body part 19 so as to be inserted into the upper and lower recesses of the slide groove 13, and a locking protrusion 21 which extends forwardly from the body part 19 so as to be engaged with an engaging groove 12 (described below) which is formed in one end piece 7 of the guard panel 4. The lock member 18 is urged forwardly of the cassette by a U-shaped leaf spring 14 which is inserted in the slide groove 13 in such a manner that it is located behind the lock member 18.

The guard panel 4 is formed of a front piece 6 and the right and left end pieces 7 which have the aforementioned rotating shafts 8, and it is U-shaped in section. The above-described engaging groove 13 is formed in the outer wall of the end piece 7 (which is on the side of the side wall 9 having the slide groove 13) extending along the center line which divides the end piece 7 into upper and lower halves.

The rotating shafts 8 extend inwardly of the cassette, as is apparent from the above description. The end portion of at least one of the rotating shafts 8 is formed into an arm 8c which extends towards the back of the cassette. One end of a tension spring 15 is connected to the end of the arm 8c, and the other end is connected to a protrusion (not shown) formed inside the cassette case 2. The guard panel 4 is thus maintained urged towards the back of the cassette, and, when the guard panel 4 is swung up or down, it is returned to its original position to close the opening 3 in the front wall of the cassette case 2.

When the magnetic tape cassette 1 thus constructed is in storage (not is use), the locking protrusion 21 of the lock member 18 is fitted in the engaging groove 12 so that the guard panel 4 is locked at its original position to close the opening 3 of the cassette. When the cassette 1 is loaded in the magnetic tape recording and reproducing device, the lock member 18 is released by a pair of lock releasing members 25 (FIG. 3) provided in the cassette insertion section, and the guard panel 4 is swung upwardly by a panel opening member 26 which is provided in the cassette insertion section.

Figure 3:
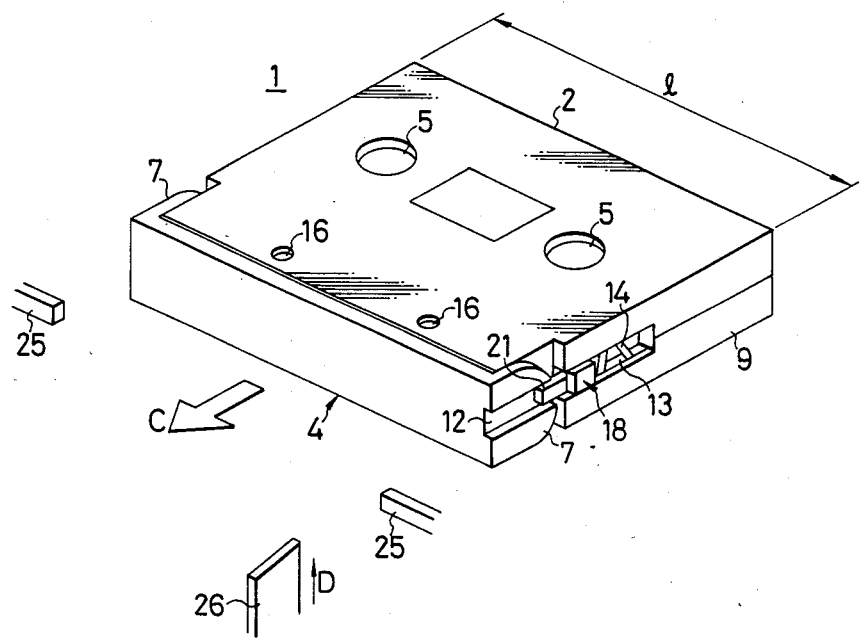
FIGS. 3 and 4 are a perspective view and a side view for a description of the operations of a lock member and a guard panel of the magnetic tape cassette according to the invention.
Figure 4:
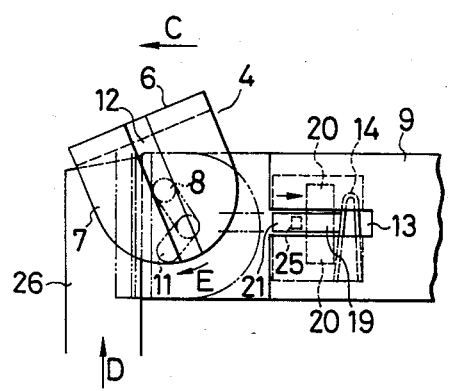

The operation of the lock member 18 and the guard panel 4 will be described with reference to FIGS. 3 and 4.

The aforementioned lock releasing members 25 are disposed symmetrically right and left in the cassette insertion section in such a manner that the distance between the ends of the lock releasing members 25 is slightly smaller than the width l of the cassette case 2. The panel opening member 26 is in the form of a plate, and is positioned at the corner of the inner part of the cassette insertion section so that it engages with the lower edge of the guard panel 4.

While the magnetic tape cassette 1 is being inserted into the cassette insertion section (moved in the direction of the arrow C), the end portion of the lock releasing bar 25 is engaged with the front end of the body part 20 of the lock member 18. As the magnetic tape cassette 1 is further inserted, the lock member 18 is moved backwardly, as a result of which the locking protrusion 21 of the lock member 18 is disengaged from the engaging groove 12 of the end piece 7. When the movement of the cassette 1 in the direction of the arrow C is completed, the top end portion of the panel opening member 26 is engaged with the cut 17, and therefore the panel opening member 26 is allowed to move upwardly, in the direction of the arrow D. Accordingly, the guard panel 4 is swung in the direction of the arrow E while the rotating shafts 8 are sliding up the shaft receiving holes 11. Finally, the guard panel 4 is held open by the panel opening member 26. In this operation, a rotational moment about the rotating shafts 18, in the direction opposite to the direction of the arrow E, and a force to return the rotating shafts 18 to the centers, of the shaft receiving holes 11 are applied to the guard panel 4 by the tension spring 15.

The top end portion of the panel opening member 26 is so tapered that, when the guard panel 4 is opened, it will not be shifted towards the back of the cassette by the elastic force of the tension spring 15.

After the guard panel 4 has been swung upwardly to open the opening 13 of the cassette, signals can be recorded on the magnetic tape T or signals previously recorded thereon can be reproduced. In unloading the magnetic tape cassette 1 from the recording and reproducing device, after the panel opening member is moved downwardly (in the direction opposite to the direction of the arrow D) the cassette 1 is moved in the direction opposite the direction of the arrow C. Accordingly, with the aid of the elastic force of the tension spring 15, the guard panel 4 closes the opening 3, and the lock releasing bar 25 is disengaged from the lock member 18, whereupon the lock member 18 is slid by the leaf spring 14 until the locking protrusion 21 is fitted into the engaging groove 13.

The slide groove 13 is so formed that it is divided into the upper and lower halves by the upper and lower cassette halves. Therefore, the lock member 18 can be readily coupled to the cassette case 2 when the upper and lower cassette halves are put together to form the cassette case 2.

The material of the cassette case 2 is not limited; that is, it may be plastic resin such as polyacetal of ABS resin. The lock member 18 may be made of plastic resin such as polyacetal or metal. However, since the parts 20 slide in the slide groove 13, it is desirable that the lock member be made of a material high in wear resistance.

The magnetic tape T may be a ferromagnetic iron oxide or chromium dioxide tape; however, it is preferable that the tape T be a metal tape or vacuum-deposited tape which is suitable for high-density recording and reproducing.

As is apparent from the above description, the two sides of the magnetic tape cassette 1 of the invention are symmetrical in configuration. Therefore, even if the cassette 1 is loaded in the recording and reproducing device with the upper side underneath, the guard panel 4 operates in the same manner. That is, both sides (A and B) of the magnetic tape cassette 1 of the invention can be used for signal recording and reproducing.

In the above-described embodiment, the locking protrusion 21 of the lock member 18 is fitted in the engaging groove 12 formed in the outer wall of the end piece 7 of the guard panel 4; however, it should be noted that the invention is not limited thereto or thereby. For instance, the magnetic tape cassette may be so designed that the locking protrusion of the lock member 18 is fitted in an engaging groove which is formed in the inner wall of the end piece. That is, the engaging groove may be a cut or recess which opens towards the back of the cassette so as to receive the locking protrusion of the lock member from behind.

As is apparent from the above description, the magnetic tape cassette of the invention has the guard panel 4 which can be swung both upwardly and downwardly. Therefore, the magnetic tape cassette of the invention is suitable for use with a multi-track signal recording and reproducing system in which both sides of a magnetic tape cassette is used. Further, the same time when the magnetic tape cassette 1 is unloaded from the recording and reproducing device, the guard panel 4 completely closes the opening 3 and is locked. Therefore, the magnetic tape T running along the opening 3 is protected from damage or dust; that is, the recording and reproducing characteristics of the tape T are maintained unchanged.

In the magnetic tape cassette 1 of the invention, the guard panel 4 is opened by a simple structure such as the lock releasing bar 25 and the panel opening member. Therefore, employment of the magnetic tape cassette 1 does not make the recording and reproducing device intricate in construction.

It has been stated that the technical concept of the invention is applied to a magnetic tape cassette which is substantially equal in size to a conventional compact cassette; however, it should be noted that the technical concept of the invention is applicable to other various magnetic tape cassettes.

We claim:

1. A magnetic tape cassette comprising a cassette case incorporating a pair of hubs on which a magnetic tape is wound and having a magnetic head inserting opening formed in the front end wall thereof, and a guard panel substantially U-shaped in section having right and left end pieces, said guard panel being swingable vertically of said cassette case to close and open said opening of said cassette case, the improvement wherein:

said guard panel has a recess formed in at least one of said right and left end pieces opening towards said cassette case, said cassette case has a pair of steps which are formed on right and left side walls thereof by setting back front end portions of said right and left side walls inwardly of said cassette case, and a slide groove formed in at least one of said right and left side walls in such a manner that said slide groove merges with said step formed on said one side wall and including upper and lower recesses formed respectively inside upper and lower halves of said one side wall in such a manner that said recesses extend towards the back of said cassette case, said cassette case being provided with a lock member having a locking protrusion protruding towards said guard panel and fitted in said recess formed in said end piece of said guard panel, said lock member being slidably inserted in said slide groove, and urging means for urging said lock member towards said guard panel, and the two sides of said cassette are symmetrical in configuration.

2. The magnetic tape cassette of claim 1, wherein said lock member comprises a main body part partially extending beyond said slide groove; said locking protrusion, which extends from said main body part towards said guard panel; and sliding parts extending laterally of said main body part and being slidably received in respective ones of said recesses.

3. The magnetic tape cassette of claim 2, wherein said urging means comprises a leaf spring positioned behind said main body part and having portions received in said recesses.

* * * * *